United States Patent [19]
Klein

[11] Patent Number: 5,745,772
[45] Date of Patent: Apr. 28, 1998

[54] ADVANCED PROGRAMMABLE INTERRUPT CONTROLLER

[75] Inventor: Dean A. Klein, Eagle, Id.

[73] Assignee: Micron Electronics, Inc., Nampa, Id.

[21] Appl. No.: 693,510

[22] Filed: Aug. 2, 1996

[51] Int. Cl.$^6$ .................................................. G06F 9/46
[52] U.S. Cl. ............................................ 395/739; 395/742
[58] Field of Search ................................. 395/739, 742, 395/868, 870

[56] References Cited

U.S. PATENT DOCUMENTS

| | | | |
|---|---|---|---|
| 5,619,705 | 4/1997 | Karnik et al. | 395/739 |
| 5,619,706 | 4/1997 | Young | 395/741 |

OTHER PUBLICATIONS

Intel Corporation, "MultiProcessor Specification, Version 1.4" Mt. Prospect, Illinois, Jul. 1995.
Intel Corporation, "82378ZB System I/O (SIO) and 82379AB System I/O APIC (SIO.A)." Mt. Prospect, Illinois, Mar. 1996.
Anderson, D.; Shanley, T., "Chapter 15: The APIC." pp. 317–372, *Pentium Processor System Architecture, Second Edition*, Massachusetts, Oct. 1995.

*Primary Examiner*—Glenn A. Auve
*Attorney, Agent, or Firm*—Seed and Berry LLP

[57] ABSTRACT

A computer system having an advanced programmable interrupt controller (APIC) is described in which an I/O APIC module is included in core logic circuitry coupled between a processor bus and a system bus. An interrupt controller is included in bridge circuitry coupled between the system bus and an expansion bus. System and expansion bus devices requiring service output interrupt request signals (IRQs) which are received by the interrupt controller. The interrupt controller then outputs an interrupt signal which is received by the I/O APIC module. The I/O APIC module initiates a system bus acknowledge cycle to receive an interrupt vector from the interrupt controller. The I/O APIC module converts the interrupt vector into a system-appropriate APIC protocol and transmits the vector on an APIC bus to local APIC modules integrated within processors of the computer system. In one embodiment, the I/O APIC module receives the system bus device IRQs directly, and the system bus acknowledge cycle is required only to obtain the expansion bus device interrupt vectors.

41 Claims, 6 Drawing Sheets

| Interrupt Vector Translation Table |||||
|---|---|---|---|
| Register | Vector | APIC INT # | Destination (rotating, specific CPU, broadcast) |
| Register 0 | vector 0 | APIC INT 0 | value as desired |
| Register 1 | vector 1 | APIC INT 1 | value as desired |
| Register 2 | vector 2 | APIC INT 2 | value as desired |
| * | * | * | * |
| * | * | * | * |
| * | * | * | * |
| Register N | vector N | APIC INT N | value as desired |

*Fig. 4A*

| Interrupt Vector Translation Table |||||
|---|---|---|---|
| Register | Vector | APIC INT # | Destination (rotating, specific CPU, broadcast) |
| Register 0 | vector 0 | APIC INT 0 | value as desired |
| Register 1 | vector 1 | APIC INT 1 | value as desired |
| Register 2 | vector 2 | APIC INT 2 | value as desired |
| * | * | * | * |
| * | * | * | * |
| * | * | * | * |
| Register N | vector N | APIC INT N | value as desired |
| Register N+1 | System IRQ | APIC INT N+1 | value as desired |
| Register N+2 | System IRQ | APIC INT N+2 | value as desired |
| Register N+3 | System IRQ | APIC INT N+3 | value as desired |
| Register N+4 | System IRQ | APIC INT N+4 | value as desired |

*Fig. 4B*

ADVANCED PROGRAMMABLE INTERRUPT CONTROLLER

TECHNICAL FIELD

This invention relates generally to computer systems, and more particularly, to programmable interrupt controllers used in computer systems.

BACKGROUND OF THE INVENTION

An I/O device within a computer system periodically requests service from a microprocessor within the computer system. The I/O device generates a signal known as an interrupt request (IRQ) to obtain the microprocessor's service. The type of service required by the I/O device depends on the type of device and its current condition. For example, a keyboard interface circuit generates an interrupt request to inform the microprocessor that a key has been pressed on a computer keyboard. The microprocessor then responds by performing an I/O read bus cycle to get the corresponding keyboard character.

In the case of each interrupt request, the microprocessor executes a program known as an interrupt service routine (ISR). Separate ISRs exist for each of the types of interrupt requests generated by various I/O devices within the computer system. Upon receipt of an interrupt request, the microprocessor temporarily suspends execution of the current program, saves the program state, and jumps to the ISR. Upon completion of the ISR, the microprocessor restores the program state and returns to the original program, beginning at the step where the program was interrupted.

Typically, microprocessors have only a few individual interrupt request inputs used to detect service requests by multiple I/O devices. Instead of being sent directly to the microprocessor, the interrupt request signals from the various of I/O devices are received by one or more devices known as a programmable interrupt controllers (PICs), which in turn produce an interrupt signal which is received by the microprocessor. One well-known example PIC is the Intel® 8259A interrupt controller. In response to receipt of an interrupt signal, the microprocessor executes interrupt acknowledge bus cycles which cause the PIC to prioritize the currently pending service requests and to provide an interrupt vector to the processor on the processor data bus. The processor uses the interrupt vector as an index into an interrupt descriptor table stored in main memory. The interrupt descriptor table provides the starting memory addresses of each ISR. The programming of the interrupt vectors into the PIC, and of the interrupt descriptor table and ISRs into main memory, is well known and is typically performed during computer system start-up/initialization.

FIG. 1 depicts a typical computer system architecture. A microprocessor 10, such as the Pentium™ processor, is connected to a CPU bus 12 which carries address, data and control signals. The CPU bus 12 is connected to a system controller 14, a DRAM controller 16, and a data path controller 26. The DRAM controller 16 accesses a main memory DRAM 18 via a memory address bus and a memory control bus 20, 22, respectively. The data portion of the CPU bus 12 is coupled with the main memory DRAM 18 by a memory data bus 24 and the data path controller 26. A cache memory SRAM 28 is connected to the CPU bus 12 and provides the processor 10 with high speed access to a subset of the information stored in the main memory DRAM 18.

The system controller 14 serves as a bridge circuit between the CPU bus 12 and a system bus, such as peripheral component interconnect (PCI) bus 30. One or more of a wide variety of PCI devices 32 could be connected to the PCI bus 30. Well-known examples include a VGA controller, a CD ROM drive circuitry module with SCSI controller, interface circuitry (such as a PCI-PCI bridge controller) coupling another bus system and associated devices to the PCI bus 30, and PCI expansion slots for future accommodation of other PCI devices not selected during the original design of the computer system.

The PCI bus 30 is coupled with an expansion bus, such as industry standard architecture (ISA) bus 34, by expansion bus interface circuitry including a PCI-ISA bridge circuit 36 and an interrupt controller 40. One or more of a wide variety of ISA devices 38 could be connected to the ISA bus 34. Well-known examples include a floppy disk drive circuitry module with DMA controller, a keyboard/mouse controller, and ISA expansion slots for future accommodation of other ISA devices not selected during the original design of the computer system.

The interrupt controller 40 receives interrupt requests (IRQs) from the PCI devices 32 and the ISA devices 38 and outputs the interrupt signal INTR to the processor 10. When an IRQ is detected by the interrupt controller 40, it asserts INTR and the processor 10 initiates interrupt acknowledge cycles on the CPU bus 12. In response, the system controller 14 acquires control of the PCI bus 30 and initiates a PCI interrupt acknowledge transaction. The interrupt controller 40 then drives the interrupt vector onto an address/data (A/D) portion of the PCI bus 30, and the system controller 14 reads the vector and terminates the PCI interrupt acknowledge transaction. In turn, the system controller 14 drives the interrupt vector onto the data portion of the CPU bus 12 and asserts a command signal BRDY# to the processor 10. The processor 10 then reads the interrupt vector and uses it to index into the interrupt descriptor table to get the starting memory address of the requisite interrupt service routine.

The interrupt controller 40 of FIG. 1 typically includes two or more PICs connected in the well-known master-slave cascade configuration. PICs such as the Intel® 8259A are primarily designed for single microprocessor systems and have no mechanism to direct interrupts to different processors within a multiple processor system. Additionally, computer systems having traditional interrupt controllers use precious processor data bus time to transfer interrupt vector information. Advanced programmable interrupt controllers (APICs) have been developed which, together with traditional interrupt controllers, better support multiple processor systems. APICs can direct an interrupt to a specified one or more of the processors within the system, and a separate dedicated interrupt controller communication (ICC) bus provides command and interrupt vector information. One well-known APIC implementation includes two separate modules—a local APIC module integrated with each of the processors and an I/O APIC module which receives I/O device interrupt requests and routes them to the local APIC modules. A well-known example of a local APIC module is that integrated in the Intel® Pentium™ P54C processor. The Intel® 82430 HX chip set includes an I/O APIC module which is placed standalone on the ISA bus.

FIG. 2 depicts a typical multiple processor computer system architecture. In addition to those components described above in connection with FIG. 1, the multiple processor system includes an I/O APIC module 42 which communicates via an interrupt controller communication (ICC) bus 44 with a plurality of local APIC modules 46, each integrated in a corresponding one of a plurality of microprocessors 11. The I/O APIC module 42 receives IRQs from the ISA devices 38, from the PCI devices 32, and from the PCI-ISA bridge circuit 36. The I/O APIC module 42 includes redirection registers (not shown), each loaded with an interrupt number corresponding to a particular one of the IRQs received. The I/O APIC module 42 sends the interrupt number on the ICC bus 44 (a three wire bus, having a clock line and two serial data lines) to the local APIC modules 46. The I/O APIC module 42 addresses one or more of the local APIC modules 46 to handle the interrupt request, and the processors 11 communicate with each other and with the I/O APIC module 42 for ICC bus arbitration and task sharing. The interrupt controller 40 does not have a significant function in the multiple processor system of FIG. 2, since it is disabled when the computer operating system detects multiple processors. Those IRQs generated internal to the PCI-ISA bridge 36 are passed to the I/O APIC module 42 via a special interrupt request signal, as shown.

Although APICs better support multiple processor systems, there exist numerous deficiencies in current implementations. The I/O APIC module 42, as a standalone chip on the ISA bus 34, results in significantly increased pin and signal line complexity relative to a single microprocessor-based computer system, such as that shown in FIG. 1. While some implementations integrate an I/O APIC module with an interrupt controller in PCI-ISA bus interface circuitry, such systems will still be made obsolete by future elimination of expansion buses such as the ISA bus. No prior art APIC-based system provides ready adaptability to future computer system designs, while maintaining compatibility with existing bus architectures.

SUMMARY OF THE INVENTION

According to the present invention, a computer system includes an advanced programmable interrupt controller (APIC) in which an I/O APIC module is integrated in core logic circuitry coupled between a processor bus and a system bus. A standard interrupt controller is included in bridge circuitry coupled between the system bus and an expansion bus. System and expansion bus devices requiring service generate interrupt request signals (IRQs) which are received by the interrupt controller. The interrupt controller then outputs an interrupt signal which is received by the I/O APIC module. The I/O APIC module initiates a system bus acknowledge cycle to receive an interrupt vector from the interrupt controller. The I/O APIC module converts the interrupt vector into a system-appropriate APIC protocol and transmits an interrupt number on an ICC bus to local APIC modules integrated within processors of the computer system. In one embodiment, the I/O APIC module receives the system bus device IRQs directly, and the system bus acknowledge cycle is required only to obtain the expansion bus device interrupt vectors.

A computer system, according to the present invention, includes a processor coupled to a processor bus which transfers data, address, and control signals to and from the processor. A first interface circuit couples the processor bus with a first I/O bus and controls the transfer of data and address signals between the processor bus and the first I/O bus. A first I/O device is connected to the first I/O bus and asserts a first interrupt request signal when requesting service by the processor. A second interface circuit couples the first I/O bus with a second I/O bus and controls the transfer of data and address signals between the first I/O bus and the second I/O bus. A second I/O device is connected to the second I/O bus and asserts a second interrupt request signal requesting service by the processor. Interrupt request controlling circuitry includes a first interrupt controller connected to the first I/O bus and coupled with the processor by a controller bus. The first interrupt controller responds to the first interrupt request signal to provide a corresponding first interrupt number to the processor on the controller bus. A second interrupt controller is connected to the second I/O bus and receives the second interrupt request signal from the second I/O device. The second interrupt controller then provides a corresponding interrupt vector to the first interrupt controller, which responsively provides a second interrupt number to the processor on the controller bus.

A method of controlling interrupt requests in a computer system is also embodied in the present invention. An advanced interrupt controller is programmed to store a plurality of interrupt numbers. An interrupt controller is programmed to store a plurality of interrupt vectors, each of which corresponds with a respective one of the interrupt numbers. An interrupt request signal is received in the interrupt controller, and an interrupt signal is produced in response thereto. The interrupt signal is received in the advanced interrupt controller, and one of the interrupt vectors stored in the interrupt controller is retrieved in response thereto. The retrieved interrupt vector is then translated into a corresponding one of the interrupt numbers.

BRIEF DESCRIPTION OF THE INVENTION

FIG. 4A is an interrupt vector translation table corresponding to the computer system architecture of FIG. 3A.

FIG. 4B is an interrupt vector translation table corresponding to the computer system architecture of FIG. 3B.

DETAILED DESCRIPTION OF THE INVENTION

An advanced programmable interrupt controller (APIC) is described in which an I/O APIC module is integrated in the core logic circuitry coupled between the processor bus and the system bus. In the following description, specific details are set forth, such as specific microprocessor, memory, bus and other device types, in order to provide a thorough understanding of the preferred embodiment of the present invention. It will be obvious, however, to one skilled in the art that the present invention may be practiced without these details. In other instances, well-known circuits and components have not been shown in detail in order not to unnecessarily obscure the invention. Similarly, those specific signals and timing protocols necessary to understand the invention are presented, while other well-known control signals and timing protocols associated with interrupt and system bus transactions are not described.

Figure 3A:
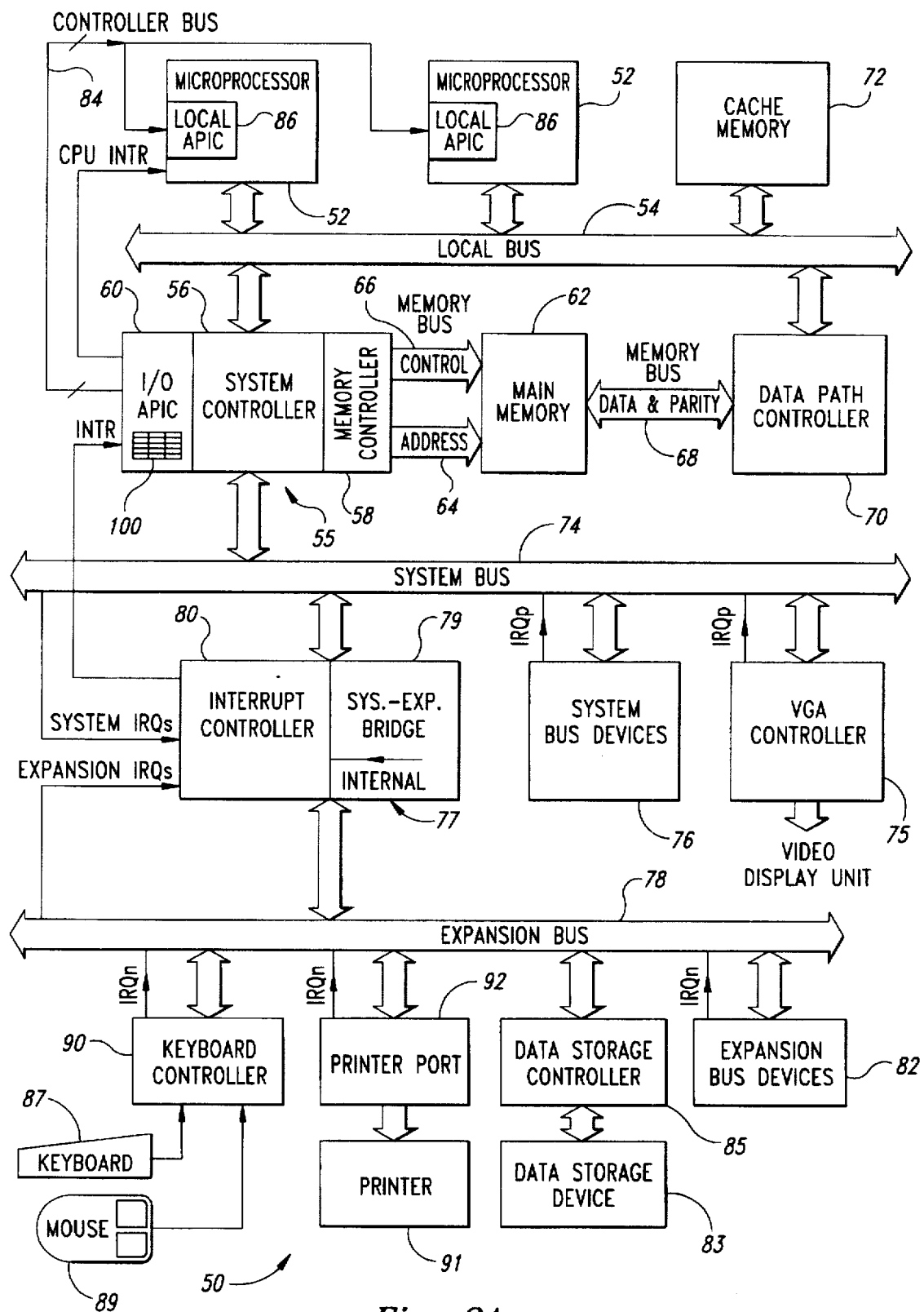
FIG. 3A is a block diagram of a computer system architecture according to a first embodiment of the present invention.

FIG. 3A depicts a computer system 50 according to a first embodiment of the present invention. A plurality of microprocessors 52, such as the Intel® Pentium™ P54C processors, are connected to a processor bus 54 which carries address, data and control signals. The processor bus 54 is connected to core logic system interface circuitry 55 having a system controller 56, a memory controller 58, such as a DRAM controller, and a system request controller, such as an I/O APIC module 60. The memory controller 58 accesses a main memory 62, such as a DRAM, via a memory address bus and a memory control bus 64, 66, respectively. The data portion of the processor bus 54 is coupled with the main memory 62 by a memory data bus 68 and a data path controller 70. A cache memory 72, such as an SRAM, is connected to the processor bus 54 and provides the processors 52 with high speed access to a subset of the information stored in the main memory 62.

The system controller 56 serves as a bridge circuit between the processor bus 54 and a system bus 74, such as a PCI bus or other suitable I/O bus. One or more of a wide variety of system bus devices 76 could be connected to the system bus 74. Well-known examples include data storage devices, such as a CD-ROM drive with EIDE controller, and data output devices, such as VGA controller 75 and associated video display unit. Other well-known examples include a SCSI controller and associated devices, a LAN adapter, interface circuitry (such as a PCI-PCI bridge controller) coupling another bus system and associated devices to the system bus 74, and system bus slots for future accommodation of other system bus devices not selected during the original design of the computer system.

The system bus 74 is coupled with an expansion bus 78, such as an ISA or other suitable I/O bus, by expansion bus interface circuitry 77 including a bus bridge circuit 79 and an interrupt controller 80, such as a standard 8259A configuration. One or more of a wide variety of expansion bus devices 82 could be connected to the expansion bus 78. Well-known examples include a data storage device 83 and associated controller 85, such as a floppy disk drive with DMA controller or a hard disk drive with IDE controller. Other well-known examples include data input devices, such as a keyboard 87 and pointing device 89 with a keyboard/mouse controller 90, data output devices, such as a printer 91 with printer port 92, and expansion bus slots for future accommodation of other expansion bus devices not selected during the original design of the computer system.

Figure 1:
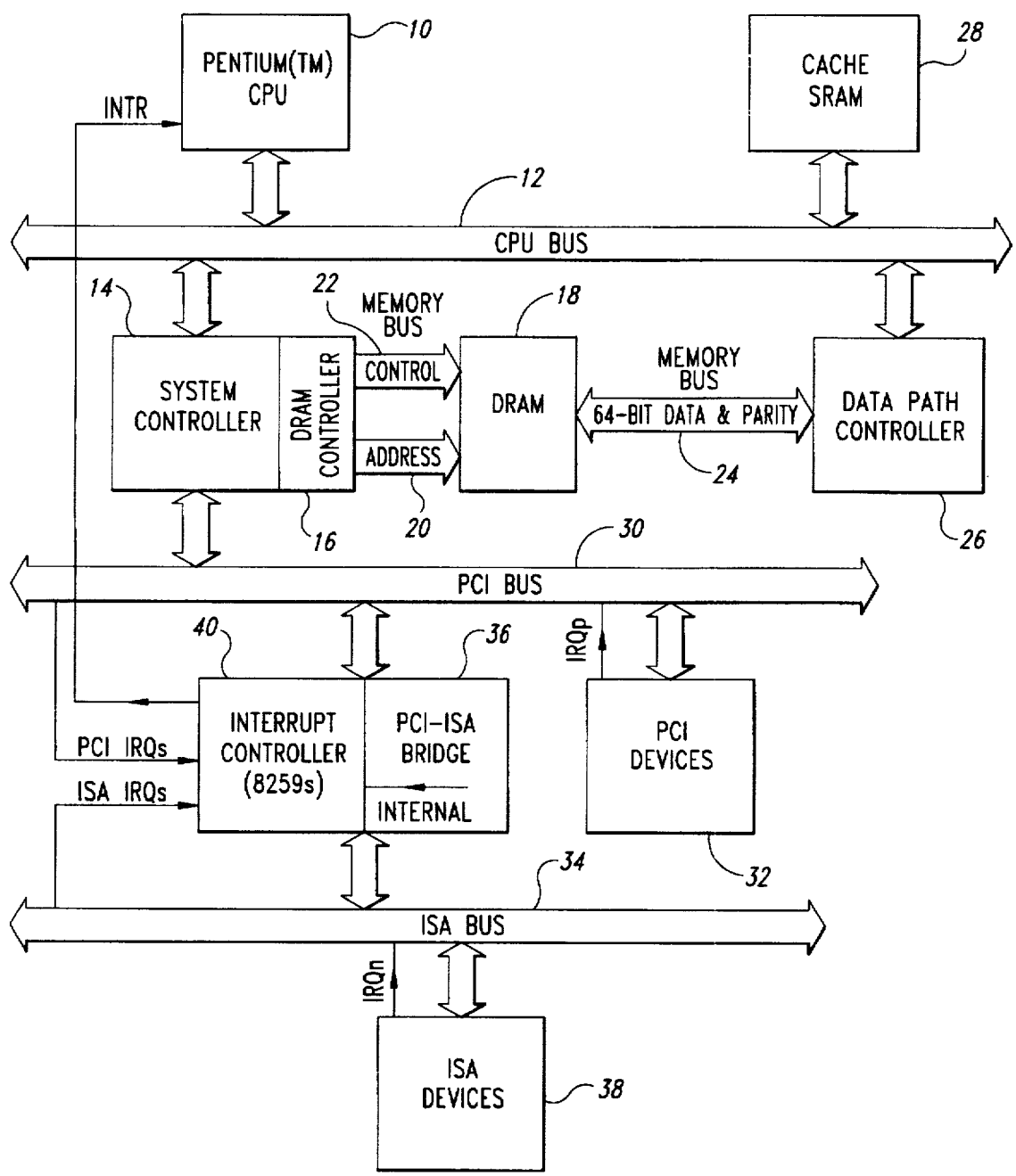
FIG. 1 is a block diagram of a first computer system architecture according to the prior art.
Figure 2:
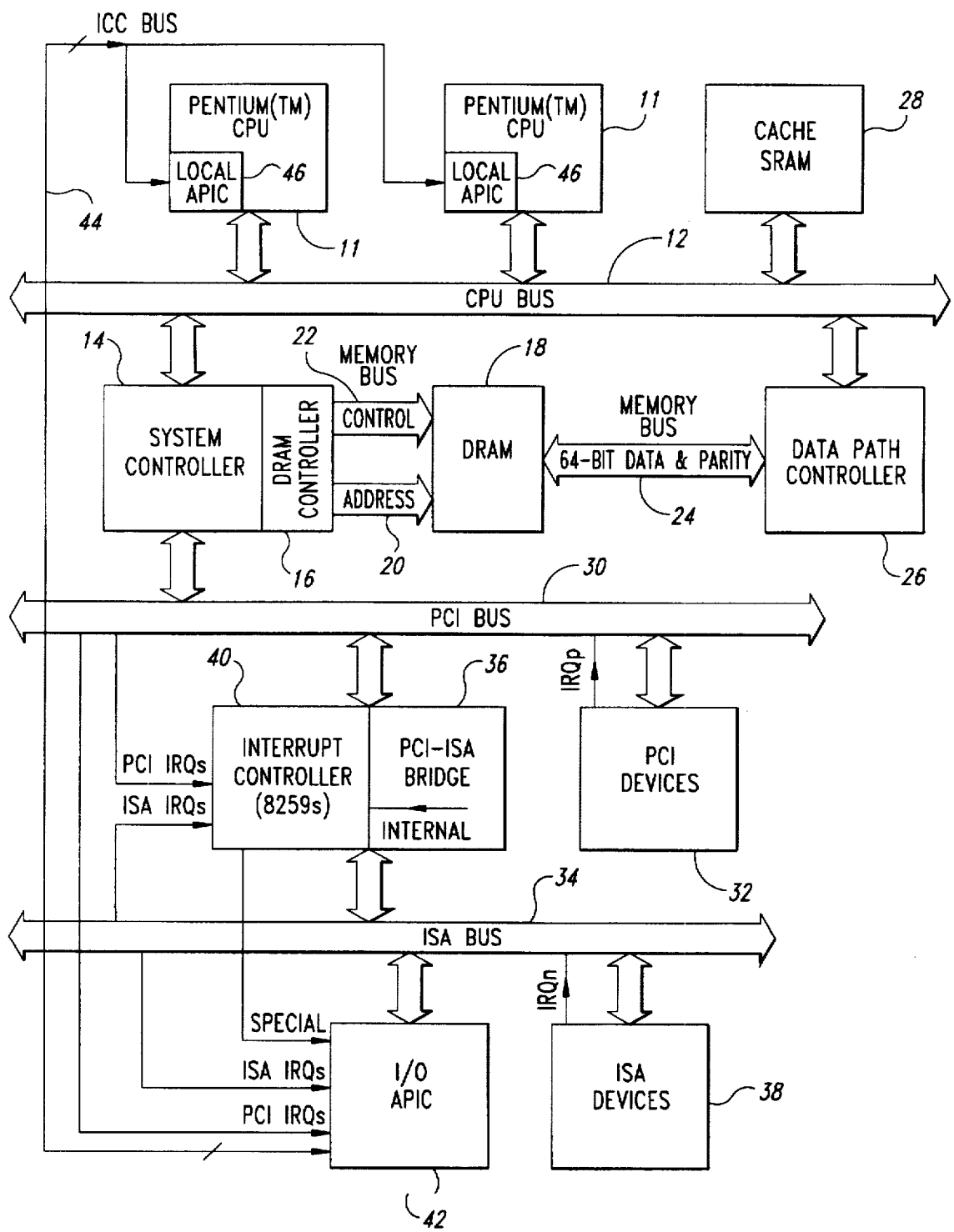
FIG. 2 is a block diagram of a second computer system architecture according to the prior art.

In the first embodiment, the interrupt controller 80 receives interrupt requests (IRQs) from both the system bus devices 76 and the expansion bus devices 82. When an IRQ is detected by the interrupt controller 80, it asserts INTR to the I/O APIC module 60. In response, the I/O APIC module 60 acquires control of the system bus 74 and initiates a system bus interrupt acknowledge transaction. The interrupt controller 80 then drives the interrupt vector onto the system bus 74, whereupon the I/O APIC module 60 reads the vector and the interrupt acknowledge cycle is terminated. Values programmed into registers 100 provide conversion of the I/O device interrupt vector into an APIC protocol interrupt number. The registers 100 may be located external to the I/O APIC module 60, although an internal location is preferred. The interrupt number is then transmitted on a controller bus 84, such as an ICC bus, to the local APIC modules 86 integrated in the processors 52. The I/O APIC module 60 can also be programmed in APIC bypass mode, in which case it passes the INTR output from the interrupt controller 80 directly to a primary one of the processors 52 as a CPU INTR input. In this case, the handling of the interrupt is according to the prior art scheme described above in connection with FIG. 1.

FIG. 4A is an interrupt vector translation table which depicts the values programmed into the registers 100 of the I/O APIC module 60 of FIG. 3A. In contrast to the prior art, in which the registers are each loaded with an interrupt number corresponding to a particular IRQ, the registers 100 of the present invention are each programmed to recognize a corresponding one of the interrupt vectors provided by the interrupt controller 80 and to provide the corresponding interrupt number. In addition to the interrupt number, each of the registers 100 includes programmed bits which specify other attributes associated with the interrupt, such as destination and delivery modes. The destination and delivery modes are not the subject of the present invention, and may be programmed as desired in a conventional manner.

Figure 3B:
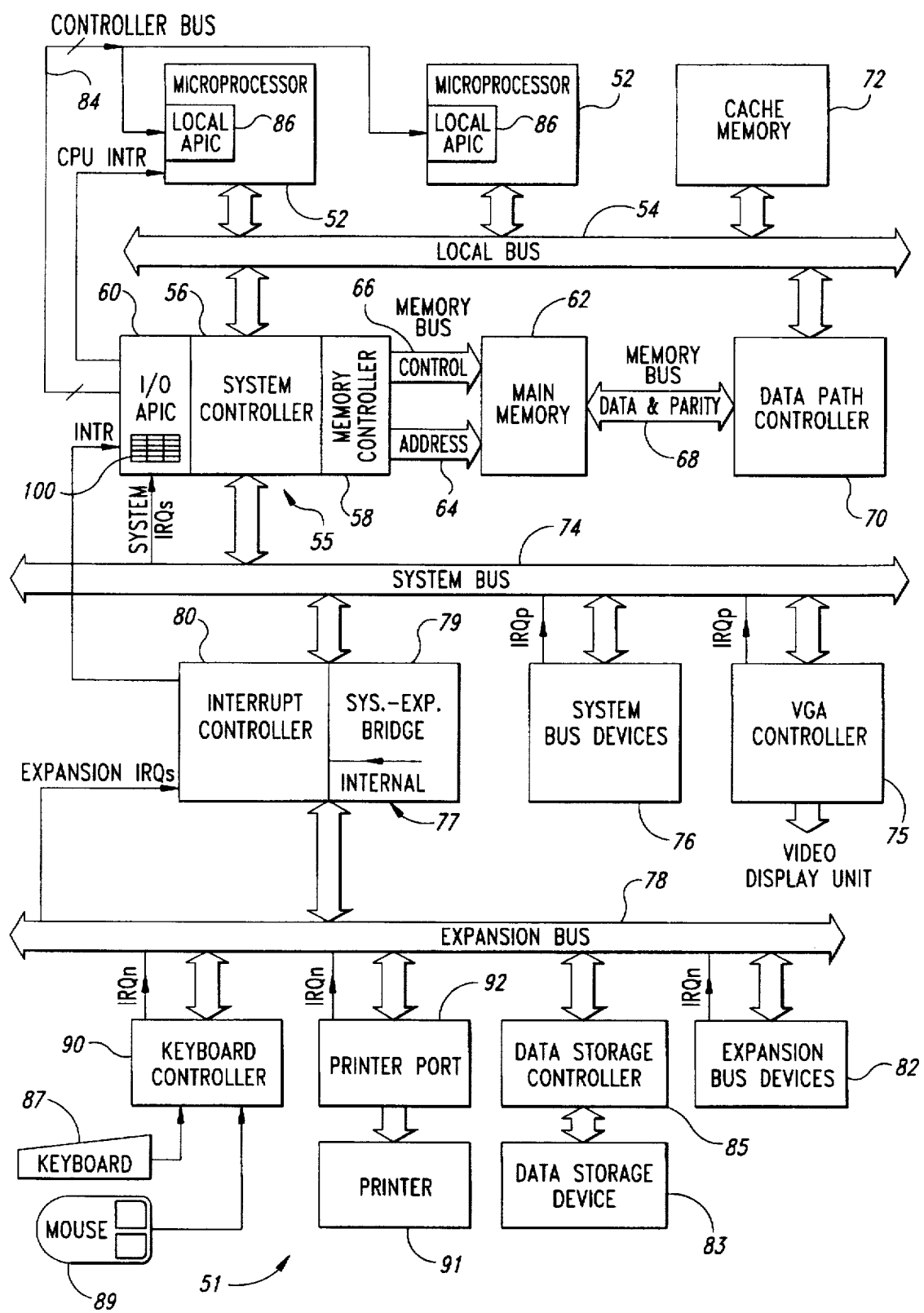
FIG. 3B is a block diagram of a computer system architecture according to a second embodiment of the present invention.

FIG. 3B depicts a computer system 51 according to a second embodiment of the present invention. In the second embodiment, the IRQs from the system bus devices 76 are received by the I/O APIC module 60, and the IRQs from the expansion bus devices 82 are received by the standard interrupt controller 80. When an IRQ originates from one of the expansion bus devices 82, the interrupt controller 80 asserts INTR and the I/O APIC module initiates a system bus interrupt acknowledge transaction as described in the preceding paragraph. When an IRQ originates from one of the system bus devices 76, the I/O APIC is programmed in registers 100 to provide the interrupt number on the controller bus 84, without a system bus interrupt acknowledge transaction.

FIG. 4B is an interrupt vector translation table which depicts the values programmed into the registers 100 of the I/O APIC module 60 of FIG. 3B. Here, certain of the registers 100 are programmed to recognize a corresponding one of the interrupt vectors provided by the interrupt controller 80, whereas others each receive a respective one of the IRQs from the system bus devices 76. The registers 100 each provide an interrupt number corresponding with the received interrupt vector or system IRQ. Additionally, each of the registers 100 includes programmed bits specifying other attributes such as destination and delivery modes.

Numerous advantages are achieved by integrating the I/O APIC module 60 into the core logic 55 coupling the local and system buses. For example, the I/O APIC module 60 can be a system bus initiator, using the same pins as the system controller to obtain the interrupt vector information from the interrupt controller 80. In contrast, the prior art has the I/O APIC module as a standalone chip on the ISA bus, thereby requiring increased pin and signal line complexity. Also, some interrupts are generated internal to the expansion bus interface circuitry 77 (e.g., timer tick, numeric error logic, etc.), thereby requiring separate logic and signal circuitry to couple the interrupt controller and prior art external I/O APIC module. Additionally, expansion buses such as the ISA bus will likely be omitted from future computer systems, thereby making the prior art interrupt control systems obsolete (including those prior art systems having the I/O APIC integrated into the interrupt controller in the PCI-ISA bus interface circuitry).

Figure 5:
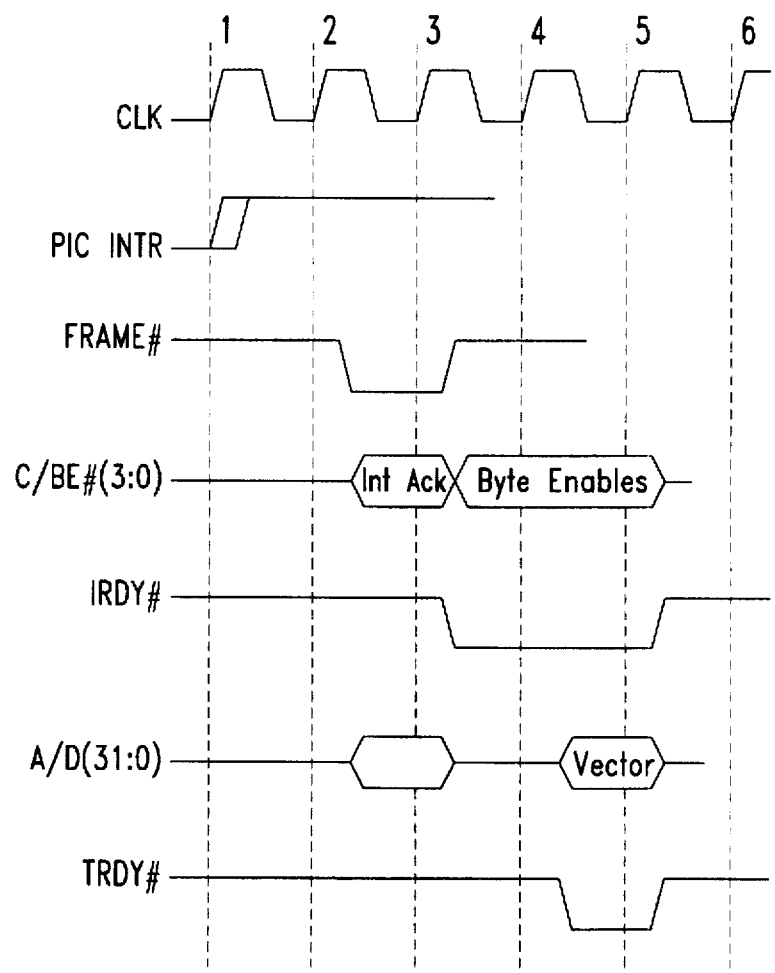
FIG. 5 is a timing diagram depicting a PCI interrupt acknowledge transaction according to the present invention.

As discussed above, the interrupt controller 80 asserts INTR when it detects an IRQ, and the I/O APIC module 60 responds by initiating a system bus interrupt acknowledge transaction. FIG. 5 is a timing diagram which depicts certain details of the system bus interrupt acknowledge transaction, using the exemplary PCI bus and associated signals well known to those skilled in the art. In the discussion below, it is understood that well-known PCI signals FRAME#, C/BE#(3:0), IRDY#, A/D(31:0), AND TRDY# are each communicated on a corresponding one or more signal lines of the system bus 74 of FIGS. 3A and 3B. FIG. 5 does not show details of PCI bus arbitration and assumes the I/O APIC module 60 acquires ownership of the system bus 74 upon receipt of the asserted INTR signal. The I/O APIC module 60 receives the asserted INTR signal from the interrupt controller 80 during clock cell 1. In response, the I/O APIC module 60 asserts the interface control signal FRAMES# and an interrupt acknowledge command on the command/byte enable (C/BE#) lines during clock cell 2. The interrupt controller 80 samples both FRAME# and the initiator ready signal IRDY# deasserted at rising edge CLK 2, followed by FRAME# asserted and IRDY# deasserted at rising edge CLK 3, thereby indicating to the interrupt controller the start of a PCI bus transaction. Although the address of the PCI target is implicit in the command type, the A/D lines are driven with a stable pattern and correct parity. The interrupt acknowledge command is registered in the interrupt controller 80 at the rising edge CLK 3.

During clock cell 3, the I/O APIC module 60 deasserts FRAME#, indicating that its last (and only) data phase is in progress, and asserts IRDY# to indicate that it is ready to receive the interrupt vector from the target interrupt controller 80. The I/O APIC module 60 also stops driving the interrupt acknowledge command and drives byte enable settings on the C/BE# lines, indicating to the interrupt controller 80 the data path(s) on which the I/O APIC module expects the interrupt vector. At the rising edge CLK 4, the interrupt controller 80 samples IRDY# asserted and registers the byte enable settings. During clock cell 4, the interrupt controller 80 drives the interrupt vector onto those A/D lines corresponding to the byte enable settings, and asserts the target ready signal TRDY#, indicating the availability of the interrupt vector. At the rising edge CLK 5, the I/O APIC module 60 samples TRDY# asserted and registers the interrupt vector. During clock cell 5, the I/O APIC module 60 deasserts the IRDY# signal, returning the system bus 74 to an idle state.

Those skilled in the art will appreciate that compatibility with current computer system designs is provided by using the well-known PCI interrupt acknowledge transaction to receive an interrupt vector associated with a service request by an expansion bus device. However, the present invention is unique in that the I/O APIC module 60 functions as the PCI initiator for the transaction. This allows the advantageous location of the I/O APIC module 60 in the core logic system interface circuitry 55, thereby providing a platform readily adaptable to future computer system designs. This is particularly true if, as described above, the I/O APIC module 60 itself receives the system bus IRQs, and only the expansion bus IRQs are routed through the interrupt controller 80. The present invention provides this future adaptability while maintaining compatibility with all existing programming models (i.e., works with any currently available PCI-ISA bridge).

It will be appreciated that, although an embodiment of the invention has been described above for purposes of illustration, various modifications may be made without deviating from the spirit and scope of the invention. Particular processor, system bus and expansion bus types have been described. However, those skilled in the art will appreciate that any number of well-known processor and bus types could be employed according to the present invention. For example, and without limitation, a VESA bus could be substituted for the described PCI bus, as could an EISA, MCA or secondary PCI bus for the described ISA bus. Similarly, the integration of an advanced programmable interrupt control module in the core logic is readily adaptable to the Cyrix/AMD SLIC protocol. Also, an I/O APIC module placed standalone on the system bus could achieve many of the advantages associated with the described core logic integrated module. Numerous variations are well within the scope of this invention. Accordingly, the invention is not limited except as by the appended claims.

I claim:

1. A computer system, comprising:

a processor;

a processor bus connected to the processor and operable to transfer data, address and control signals to and from the processor;

system interface circuitry connected to the processor bus, the system interface circuitry including a system bus controller coupling a system bus with the processor bus and controlling the transfer of data and address signals between the processor bus and the system bus;

expansion interface circuitry coupling an expansion bus with the system bus and controlling the transfer of data and address signals between the expansion bus and the system bus;

an expansion bus device connected to the expansion bus and operable to transfer data to and from the processor, the expansion bus device operable to assert a first interrupt request signal requesting service from the processor;

an interrupt controller connected to the expansion bus and operable to receive the first interrupt request signal and to provide a corresponding first interrupt vector; and a system request controller connected to the system bus and coupled with the processor by a controller bus, the system request controller operable to receive the first interrupt vector and to provide a corresponding first interrupt number to the processor on the controller bus to initiate the service requested by the expansion bus device.

2. The computer system of claim 1 wherein the system request controller is integrated into the system interface circuitry coupling the processor bus with the system bus.

3. The computer system of claim 1 wherein the interrupt controller is integrated into the expansion interface circuitry coupling the expansion bus with the system bus.

4. The computer system of claim 1 wherein the system bus is a peripheral component interconnect bus.

5. The computer system of claim 1 wherein the system bus is a peripheral component interconnect bus and the system request controller is an input/output advanced programmable interrupt controller.

6. The computer system of claim 1 wherein the expansion bus is an industry standard architecture bus.

7. The computer system of claim 1, further comprising a system bus device connected to the system bus and operable to transfer data to and from the processor, the system bus device operable to assert a second interrupt request signal requesting service from the processor, and wherein the interrupt controller is operable to receive the second interrupt request signal and to provide a second interrupt vector, and wherein the system request controller is operable to receive the second interrupt vector and to provide a corresponding second interrupt number to the processor on the controller bus to initiate the service requested by the system bus device.

8. The computer system of claim 7 wherein the processor is a first processor, and further comprising a second processor connected to the processor bus and to the controller bus, and wherein the system request controller is operable to provide the first and second interrupt numbers on the controller bus to initiate the service requested by the expansion bus device and system bus device, respectively, from at least one of the first and second processors.

9. The computer system of claim 1, further comprising a system bus device connected to the system bus and operable to transfer data to and from the processor, the system bus device operable to assert a second interrupt request signal requesting service from the processor, and wherein the system request controller is operable to receive the second interrupt request signal and to provide a corresponding second interrupt number to the processor on the controller bus to initiate the service requested by the system bus device.

10. The computer system of claim 9 wherein the processor is a first processor, and further comprising a second processor connected to the processor bus and to the controller bus, and wherein the system request controller is operable to provide the first and second interrupt numbers on the controller bus to initiate the service requested by the expansion bus device and system bus device, respectively, from at least one of the first and second processors.

11. The computer system of claim 1 wherein the processor is a first processor, and further comprising a second processor connected to the processor bus and to the controller bus, and wherein the system request controller is operable to provide the first interrupt number on the controller bus to initiate the service requested by the expansion bus device from at least one of the first and second processors.

12. A computer system, comprising:

a processor;

a processor bus connected to the processor and operable to transfer data, address and control signals to and from the processor;

system interface circuitry connected to the processor bus, the system interface circuitry including a system bus controller coupling a system bus with the processor bus and controlling the transfer of data and address signals between the processor bus and the system bus;

a system bus device connected to the system bus and operable to transfer data to and from the processor, the system bus device operable to assert an interrupt request signal requesting service from the processor;

an interrupt controller connected to the system bus and operable to receive the interrupt request signal and to provide a corresponding interrupt vector; and a system request controller connected to the system bus and coupled with the processor by a controller bus, the system request controller operable to receive the interrupt vector and to provide a corresponding interrupt number to the processor on the controller bus to initiate the service requested by the system bus device.

13. The computer system of claim 12 wherein the processor is a first processor, and further comprising a second processor connected to the processor bus and to the controller bus, and wherein the system request controller is operable to provide the interrupt number on the controller bus to initiate the service requested by the system bus device from at least one of the first and second processors.

14. The computer system of claim 12 wherein the system bus device is a data input device.

15. The computer system of claim 12 wherein the system bus device is a data output device.

16. The computer system of claim 12 wherein the system bus device is a data storage device.

17. A computer system having a processor, a processor bus connected to the processor to transfer data, address and control signals to and from the processor, a first interface circuit coupling the processor bus with a first I/O bus, a first I/O device connected to the first I/O bus and operable to assert a first interrupt request signal requesting service from the processor, a second interface circuit coupling the first I/O bus with a second I/O bus, a second I/O device connected to the second I/O bus and operable to assert a second interrupt request signal requesting service from the processor, and interrupt request controlling circuitry, the interrupt request controlling circuitry comprising:

a first interrupt controller connected to the first I/O bus and coupled with the processor by a controller bus, the first interrupt controller operable to respond to each of the first and second interrupt request signals to provide a corresponding one of a first and second interrupt numbers to the processor on the controller bus to initiate the service requested by a corresponding one of the first and second I/O devices; and a second interrupt controller connected to the second I/O bus and operable to receive the second interrupt request signal from the second I/O device and to provide a corresponding interrupt vector to the first interrupt controller.

18. The computer system of claim 17 wherein the first interrupt controller is integrated into the first interface circuitry coupling the processor bus with the first I/O bus.

19. The computer system of claim 17 wherein the first interrupt controller receives the first interrupt request signal and produces the first interrupt number in response thereto.

20. The computer system of claim 17 wherein the second interrupt controller receives the first interrupt request signal and provides a corresponding interrupt vector to the first interrupt controller, the first interrupt controller producing the first interrupt number in response thereto.

21. The computer system of claim 17 wherein the second interrupt controller receives the first interrupt request signal and produces an interrupt signal in response thereto, the second interrupt controller also providing a corresponding interrupt vector to the first interrupt controller, and wherein the first interrupt controller receives the interrupt signal and the interrupt vector and produces the first interrupt number in response thereto.

22. The computer system of claim 17 wherein the second interrupt controller produces an interrupt signal in response to receipt of the second interrupt request signal, and wherein the first interrupt controller receives the interrupt signal and the interrupt vector and produces the second interrupt number in response thereto.

23. Interrupt request controlling circuitry, comprising:

an interrupt controller operable to receive an interrupt request signal and produce an interrupt signal in response thereto, the interrupt controller storing an interrupt vector corresponding with the interrupt request signal; and an advanced interrupt controller coupled with the interrupt controller and operable to receive the interrupt signal and retrieve the interrupt vector in response thereto, the advanced interrupt controller producing an interrupt number corresponding with the interrupt vector.

24. The interrupt request controlling circuitry of claim 23 wherein the interrupt controller is operable to receive a second interrupt request signal and produce the interrupt signal in response thereto, the interrupt controller storing a second interrupt vector corresponding with the second interrupt request signal, and wherein the advanced interrupt controller is operable to retrieve the second interrupt vector in response to the interrupt signal and produce a second interrupt number corresponding with the second interrupt vector.

25. The interrupt request controlling circuitry of claim 24 wherein the interrupt controller is operable to receive the second interrupt request signal from a device connected to a peripheral component interconnect bus.

26. The interrupt request controlling circuitry of claim 23 wherein the advanced interrupt controller is operable to receive a second interrupt request signal and produce a corresponding second interrupt number in response thereto.

27. The interrupt request controlling circuitry of claim 23 wherein the interrupt controller is operable to receive the interrupt request signal from a device connected to an industry standard architecture bus.

28. The interrupt request controlling circuitry of claim 23 wherein the interrupt controller and the advanced interrupt controller are coupled by a peripheral component interconnect bus and the advanced interrupt controller retrieves the interrupt vector by initiating an interrupt acknowledge bus cycle.

29. The interrupt request controlling circuitry of claim 23 wherein the interrupt controller is operable to receive the interrupt request signal from a device connected to an industry standard architecture bus, and wherein the interrupt controller and the advanced interrupt controller are coupled by a peripheral component interconnect bus, the advanced interrupt controller retrieving the interrupt vector by initiating an interrupt acknowledge bus cycle.

30. The interrupt request controlling circuitry of claim 29 wherein the advanced interrupt controller is operable to receive a second interrupt request signal from a device connected to the peripheral component interconnect bus and produce a corresponding second interrupt number in response thereto.

31. A method of controlling interrupt requests in a computer system, comprising the steps of:

programming an advanced interrupt controller to store a plurality of interrupt numbers;

programming an interrupt controller to store a plurality of interrupt vectors, each corresponding with a respective one of the interrupt numbers;

receiving an interrupt request signal in the interrupt controller and producing an interrupt signal in response thereto;

receiving the interrupt signal in the advanced interrupt controller and responsively retrieving one of the interrupt vectors from the interrupt controller; and translating the retrieved interrupt vector into the corresponding one of the interrupt numbers.

32. The method of claim 31 wherein retrieving the one of the interrupt vectors includes the step of performing an interrupt acknowledge bus cycle.

33. The method of claim 31, further comprising the step of receiving a second interrupt request signal in the advanced interrupt controller and producing a corresponding one of the interrupt numbers in response thereto.

34. The method of claim 33 wherein the interrupt request signal is received from an I/O device connected to a first bus and the second interrupt request signal is received from an I/O device connected to a second bus.

35. The method of claim 31, further comprising the steps of:

receiving a second interrupt request signal in the interrupt controller and producing the interrupt signal in response thereto;

receiving the interrupt signal in the advanced interrupt controller and responsively retrieving a second one of the interrupt vectors from the interrupt controller; and translating the retrieved second interrupt vector into the corresponding one of the interrupt numbers.

36. The method of claim 35 wherein the interrupt request signal is received from an I/O device connected to a first bus and the second interrupt request signal is received from an I/O device connected to a second bus.

37. In a computer system having a processor, a processor bus to transfer data, address and control signals to and from the processor, a memory for storing data and programs at locations addressable by the processor, a system interface circuit coupling the processor bus with a system bus to which a system bus device is connected, and an expansion interface circuit coupling the system bus with an expansion bus to which an expansion bus device is connected, the expansion bus device being operable to assert a first interrupt request signal requesting the processor to execute a first interrupt service program, the system bus device being operable to assert a second interrupt request signal requesting the processor to execute a second interrupt service program, the first and second interrupt service programs being selected by first and second interrupt numbers, respectively, a method of providing the first and second interrupt numbers to the processor, comprising the steps of:

receiving the first interrupt request signal in the expansion interface circuit and producing an interrupt signal in response thereto;

receiving the interrupt signal in the system interface circuit;

translating the first interrupt request signal into a corresponding first interrupt vector; and translating the first interrupt vector into the first interrupt number.

38. The method of claim 37, further comprising the steps of:

receiving the second interrupt request signal in the system interface circuit; and translating the second interrupt request signal into the second interrupt number.

39. The method of claim 37, further comprising the steps of:

receiving the second interrupt request signal in the expansion interface circuit and producing the interrupt signal in response thereto;

receiving the interrupt signal in the system interface circuit;

translating the second interrupt request signal into a corresponding second interrupt vector; and translating the second interrupt vector into the second interrupt number.

40. The method of claim 37, further comprising a step prior to translating the first interrupt vector into the first interrupt number, the prior step transferring the first interrupt vector from the expansion interface circuit to the system interface circuit.

41. The method of claim 40 wherein transferring the first interrupt vector includes the step of performing a system bus interrupt acknowledge cycle.

* * * * *